United States Patent
Efimov

(10) Patent No.: US 8,078,014 B1
(45) Date of Patent: Dec. 13, 2011

(54) HIGH-SPEED ELECTRO-OPTICAL MODULATOR

(75) Inventor: Oleg M. Efimov, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 367 days.

(21) Appl. No.: 12/234,980

(22) Filed: Sep. 22, 2008

(51) Int. Cl.
*G02F 1/035* (2006.01)

(52) U.S. Cl. .................................. 385/2; 385/1; 385/37

(58) Field of Classification Search .................. None
See application file for complete search history.

(56) References Cited

U.S. PATENT DOCUMENTS

| | | | |
|---|---|---|---|
| 6,640,020 B2 | 10/2003 | Ionov | |
| 2001/0021294 A1* | 9/2001 | Cai et al. | 385/37 |
| 2002/0097945 A1* | 7/2002 | Chang et al. | 385/10 |
| 2003/0235368 A1* | 12/2003 | Kulishov et al. | 385/40 |

FOREIGN PATENT DOCUMENTS

FR 2661256 A1 * 10/1991

OTHER PUBLICATIONS

A. Irace et al. All-silicon optoelectronic modulator with 1 GHz switching capability. Electronics Letters, 39:2:232, Jan. 2003.*
A. Secchi et al. Design of electro-optic Bragg amplitude modulator. Proceedings of COMSOL Users Conference 2006, retrieved from cds.comsol.com/access/dl/papers/1629/Secchi.pdf.*
I.M. Jung et al. Efficient optical intensity modulator based on the electrically tunable LiNbO3 reflection grating for analog fiber-optic links. Journal of the Optical Society of Korea, 11:1:1, Mar. 2007.*
L. Pierno et al. A lithium niobate electro-optic tunable Bragg filter fabricated by electron beam lithography. Journal of Optics A: Pure and Applied Optics, 10:064017, May 2008.*
W. Xu et al. Electrically tunable thermally-poled Bragg gratings. Bragg Gratings, Photosensitivity, and Poling in Glass Waveguides, vol. 33 of OSA Trends in Optics and Photonics Series, paper DA3, Sep. 1999.*
J. Hukriede, D. Runde and D. Kip, "*Fabrication and application of holographic Bragg gratings in lithium niobate channel waveguides,*" J. Phys. D: Appl. Phys. 36 (2003) R1-R16.
Nadir Dagli, "*High-Speed Photonic Devices,*" Series in Optics and Optoelectronics, 2007, pp. 31-41, Taylor & Francis Group, LLC, Boca Raton, FL.

* cited by examiner

*Primary Examiner* — Mike Stahl
(74) *Attorney, Agent, or Firm* — Christie, Parker, Hale

(57) ABSTRACT

A method of amplitude electro-optic modulation. The method includes transmitting a narrowband laser light into an electro-optically active waveguide in a first direction. The electro-optically active waveguide has a grating for reflecting the narrowband laser light. The method also includes applying an electric signal to the electro-optically active waveguide and modifying the reflection of the grating in a wavelength region of the narrowband laser light by application of the electric signal.

12 Claims, 5 Drawing Sheets

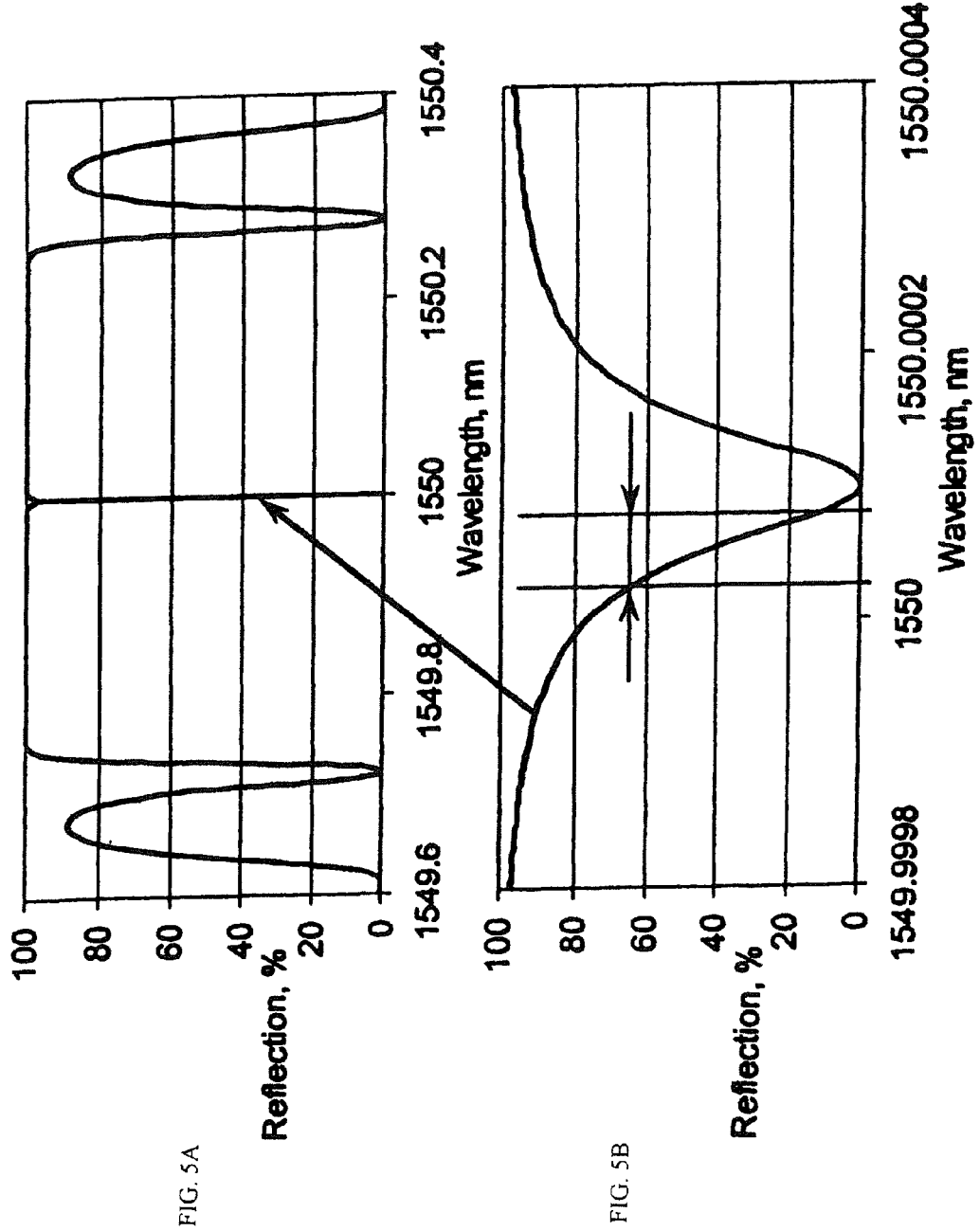

HIGH-SPEED ELECTRO-OPTICAL MODULATOR

FIELD OF THE INVENTION

The present invention relates to the processing of optical signals and, more particularly, to a high-speed amplitude electro-optical modulator.

BACKGROUND OF THE INVENTION

High-speed amplitude electro-optical modulators (AEOMs) are necessary components in a growing number of applications, such as wireless communication, electronic warfare, etc. A method for intensity modulation in AEOMs, according to the prior art, is to apply electronic signals to control the refractive index of a waveguide made from electro-optically active materials and shift the phase of one of the interfering beams of a Mach-Zehnder interferometer.

The prior art relevant to the proposed method is described in a recent book by N. Dagli "High-speed photonic devices," Press, 2007, Chapter 3; U.S. Pat. No. 6,640,020 (S. Ionov, "Method and apparatus for electro-optic delay generation of optical signals," U.S. Pat. No. 6,640,020, October 2003); and the review by J. Hukriede, D. Runde, D. Kip, "Fabrication and application of holographic Bragg gratings in lithium niobate channel waveguides," J. Phys. D: App. Phys. v. 36, pp. R1-R16, 2003, the entire content of all three of which is incorporated herein by reference.

The basic disadvantage of previous devices is that a high driving voltage is required for a $\pi$-phase shift in the AEOM and complete elimination (or destructive interference) of the transmitted optical signal. Therefore, there is a need for a low-driving voltage high-speed AEOM.

SUMMARY OF THE INVENTION

In accordance with the present invention, a method and apparatus is provided for high-speed amplitude electro-optical modulation. An embodiment of the present invention provides an AEOM, including a high-speed AEOM operating at low voltages, that uses direct modulation of light reflected from sharp spectral fronts of optical gratings to control the intensities of transmitted or reflected beams by shifting grating spectra by applying an electrical field to an electro-optically active waveguide. Changes in transmitted and reflected signals result from coherent combining of beamlets reflected from all layers of the grating.

In an embodiment of an AEOM for high speed modulation, a radio frequency (RF) signal may be applied to an electro-optically active waveguide, so that reflected optical beamlets with modified phases are coherently combined and constructively interfere with each other, resulting in a short pulse reflection corresponding to the applied RF signal modifying the refractive index of the waveguide.

An embodiment of the present invention provides a method of amplitude electro-optic modulation. The method includes transmitting a narrowband laser beam into an electro-optically active waveguide in a first direction. The electro-optically active waveguide has a grating for reflecting the narrowband laser light. The grating has a grating reflection spectrum having a transition between high and low reflections of the narrowband laser light. The narrowband laser light has a spectrum within a spectrum of the transition. The method also includes applying an electric field signal to the electro-optically active waveguide, and modifying a reflection of the grating in the spectrum of the narrowband laser light by application of the electric signal.

The grating may be a narrowband reflection grating, a phase-shifted grating, or a Fabry-Perot-type filter including two identical spatially shifted chirp gratings.

Another embodiment of the present invention provides a method of amplitude electro-optic modulation. The method includes transmitting a narrowband laser light into an electro-optically active waveguide in a first direction. The electro-optically active waveguide has a grating for reflecting the narrowband laser light. The method also includes applying a pulsed electric signal to the electro-optically active waveguide in a second direction substantially opposite to the first direction, and modifying the reflection of the grating in a wavelength region of the narrowband laser light by application of the electric signal.

The pulsed electric signal may have a speed substantially similar to a speed of the narrowband laser light.

Another embodiment of the present invention provides an amplitude electro-optic modulator. The amplitude electro-optic modulator includes an electro-optically active waveguide for propagating narrowband light in a first direction. The electro-optically active waveguide has a grating for reflecting the narrowband laser light. The grating has a grating reflection spectrum having a transition between high and low reflection. The narrowband laser light has a spectrum substantially within the spectrum of the grating. The amplitude electro-optic modulator also includes at least two electrodes proximate to the grating and disposed to impose an electric field through the electro-optically active waveguide to modify the reflection spectrum of the grating.

The amplitude electro-optic modulator may further include an optical circulator coupled to the waveguide for inputting the narrowband light into the grating and receiving and directing reflected light from the grating.

The amplitude electro-optic modulator may further include an optical beamsplitter coupled to the waveguide for inputting the narrowband light into the grating and receiving and directing reflected light from the grating.

Another embodiment of the present invention provides an amplitude electro-optic modulator including an electro-optically active waveguide for propagating narrowband light in a first direction. The electro-optically active waveguide has a grating for reflecting the narrowband laser light. The grating has a grating reflection spectrum having a transition between high and low reflection. The narrowband laser light has a spectrum substantially within the spectrum of the grating. The amplitude electro-optic modulator further includes at least two electrodes proximate to the grating and disposed to impose an electric pulse along the electro-optically active waveguide in a direction substantially opposite the first direction.

BRIEF DESCRIPTION OF THE DRAWINGS

FIG. 5A is a graph of the calculated reflection percentage versus wavelength for a 7 mm length phase-shifted grating on a Ti:LiNbO₃ waveguide.

FIG. 5B is a graph of an enlarged view of a region of FIG. 5A.

DETAILED DESCRIPTION

An embodiment of the present invention provides an AEOM, including a high-speed AEOM operating at low voltages. Currently, high-speed modulators use different modifications of Mach-Zehnder interferometers and require a driving voltage of about 1V to 5V. Embodiments of the present invention use direct modulation of light reflected from sharp spectral fronts of optical gratings. This requires lower driving voltages than previous devices to control the intensities of transmitted or reflected beams by shifting grating spectra by applying an electrical field to an electro-optically active waveguide.

Figure 1:
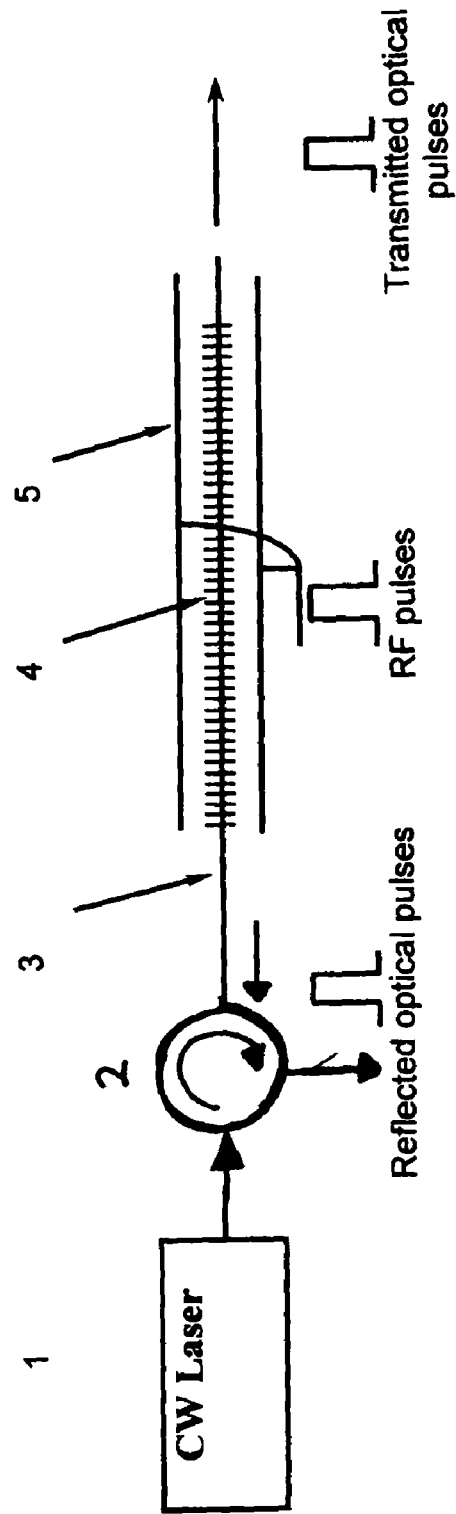
FIG. 1 is a schematic representation of an exemplary embodiment of an AEOM in accordance with the present invention.

FIG. 1 is a schematic representation of an exemplary embodiment of an AEOM in accordance with the present invention, where radiation of a narrowband CW laser 1 passes through a waveguide 3, such as a Ti:LiNbO₃ waveguide or another electro-optically active waveguide, with a narrowband grating 4. A radio frequency (RF) signal is applied to electrodes 5. The optical reflections from all layers (or grooves) of the grating 4 exist concurrently and are continuous due to the utilization of the CW laser 1. When an RF pulse is applied to the electrodes 5 proximate to the waveguide 3, the refractive index of the waveguide 3 and phase relations of beamlets reflected from the grating 4 layers are modified. For example, the electrodes 5 may be on both sides of the waveguide 3 and/or above the waveguide 3.

A change in the index of refraction results in a spectral shift of the grating spectrum. If the spectrum of the laser is in the region of grating spectral fronts, even a small shift of the grating spectrum results in considerable modulation of transmitted or reflected beam intensity. Therefore, rather small voltages applied to the electrodes are required to control or modify reflection intensities.

Figure 2:
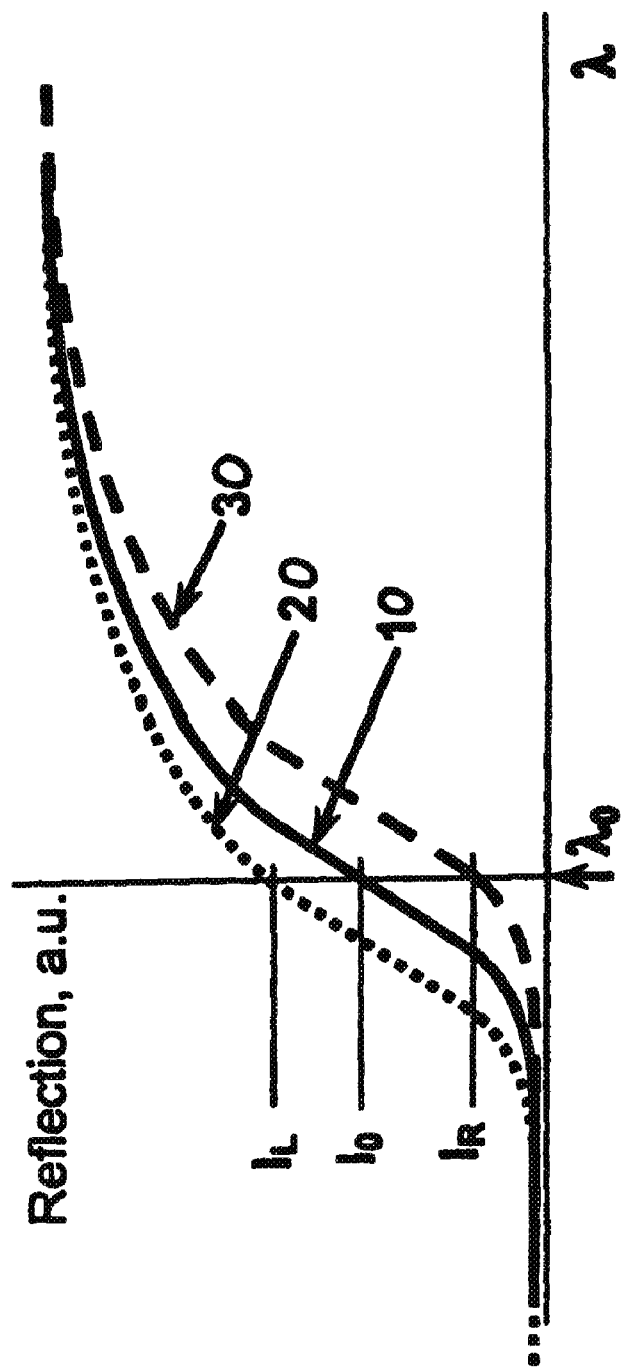
FIG. 2 is a graph of reflection efficiency versus wavelength for the AEOM of FIG. 1.

In FIG. 2, the front edge of a grating reflection spectrum is shown by curve 10. Narrowband CW laser radiation at wavelength $\lambda_0$ is reflected at an intensity $I_0$. Application of positive or negative voltage to the electrodes 5 results in modification of the refractive index and spectral shifts of reflection spectra to the left (curve 20) or right (curve 30) relative to the initial curve 10. Because of spectral shifts, the intensities $I_L$, $I_R$ of reflections are modified. Thus, modulating the voltage of the applied electrical signal allows modulating of the intensities of transmitted or reflected signals. However, both the laser radiation spectral line and the grating reflection spectrum should be narrow with a sharp transition between high and low reflections. As a result, small changes in the voltage of applied electrical signals will result in high modulations of reflected/transmitted beams in the range from $I_R$ to $I_L$.

The response of the grating (changes in transmitted and reflected signals) results from coherent combining (constructive or destructive interference) of beamlets reflected from all layers of grating. It is known in the art that gratings may be implemented as grooves on a waveguide or layers of varying indices of refraction within a waveguide. Hereinafter, references to layers will be intended to include waveguides with either grooves or layers. Therefore, the embodiment shown in FIG. 1, where the RF signal has no specific direction of propagation, has a frequency restriction because the minimum time of the grating response is equal to the time required for a round-trip of the optical signal over the grating. For the total response of the grating, the optical signal has to reach the last groove or layer of the grating and reflect from this layer (as well as from all the previous layers) and travel back to the beginning of the grating to interfere with the reflection from the first layer. The RF signal must be applied to the entire length of the electrodes during this time to modify reflections from all the layers of the grating. For the grating with length L and a refractive index n, this time τ is $$\tau = \frac{2nL}{c}$$

where c is the speed of light in the vacuum. Therefore, the frequency limit $F_{lim}$ of RF signal is $$F_{lim} = \frac{c}{2nL}.$$

For example, for a grating with length of about 1 cm on a Ti:LiNbO₃ waveguide, this time τ is about $1.4 \cdot 10^{-10}$ s. Therefore, the maximum operation frequency is about 7 GHz. If the frequency of modulation is lower than $F_{lim}$, either transmitted or reflected beams can be used as modulated beams, and the points of electrical signal application to the electrodes are not important. For high frequency applications (using high frequency radio signals or RF signals), the time of the electrical signal change is much shorter than the time of optical beam propagation through the grating and another approach has to be used.

Figure 3:
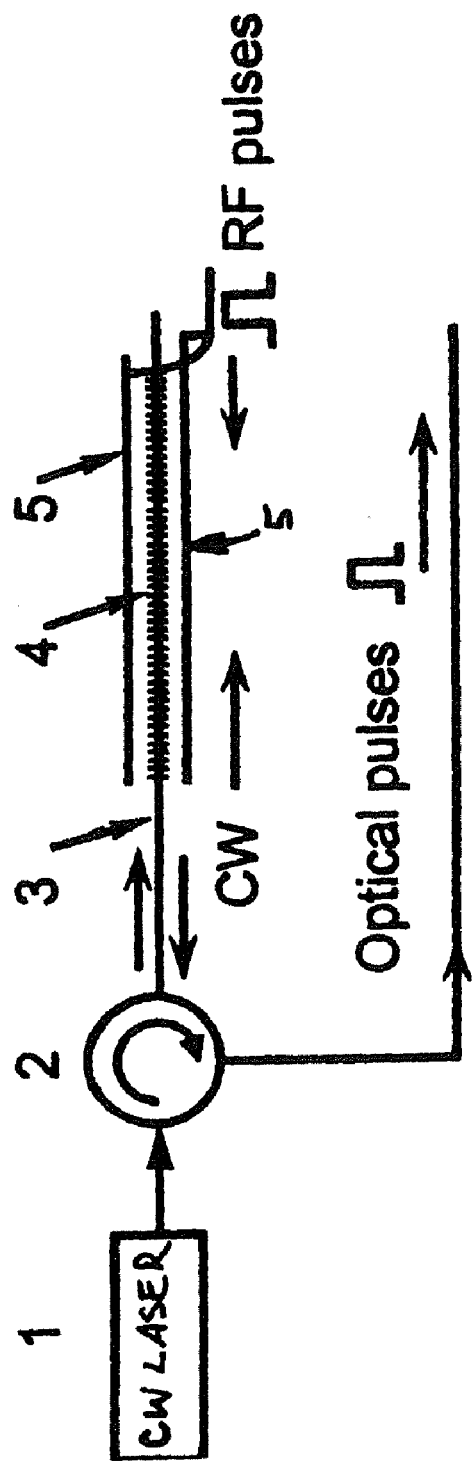
FIG. 3 is a schematic representation of an exemplary embodiment of an AEOM in accordance with the present invention.

FIG. 3 is a schematic representation of an exemplary embodiment of an AEOM for high speed modulation in accordance with the present invention, where radiation of a narrowband CW laser 1 passes through an optical circulator 2 and then a waveguide 3, such as a Ti:LiNbO₃ waveguide or another electro-optically active waveguide, with a narrowband grating 4, from left to right. A radio frequency (RF) signal propagates through electrodes 5 in an opposite direction, from right to left, as shown. The optical reflections from all layers (or grooves) of the grating 4 exist concurrently and are continuous due to the utilization of the CW laser 1. When an RF pulse propagates through the electrodes 5 on both sides of the waveguide 3, the refractive index of the waveguide 3 and phase relations of beamlets reflected from the grating 4 layers are modified.

The speed of RF pulse propagation through the electrodes and the speed of optical pulse propagation through the waveguide are substantially the same. As a result, the RF pulse will collect all the reflected optical beamlets with modified phases analogous to a snow-plough collecting snow in front of it. Therefore, when the RF pulse reaches the beginning of waveguide 3 (next to the circulator 2), all the beamlets with modified phases are coherently combined and constructively interfere with each other, resulting in a short pulse reflection corresponding to the applied RF pulse modifying the refractive index of the waveguide 3.

When the RF pulses are short (e.g., high-speed applications), the refractive index of only a small fraction of the grating is modified at a time. Therefore, the intensity of the transmitted CW signal decreases only a small amount during the time of electrical pulse propagation though the grating. However, the reflected signal has considerable intensity as a result of coherent summing (or constructive interference) of the reflections from the entire grating. Here, it is desirable to utilize sampled input RF pulses with a small duty cycle (e.g., <50%) to enable the recovery of light energy stored in the grating during the time between RF pulses. A lower duty cycle will result in substantially total recovery of the light energy transmitted through the grating and high reproducibility of intensity of the reflected optical pulses.

Figure 4:
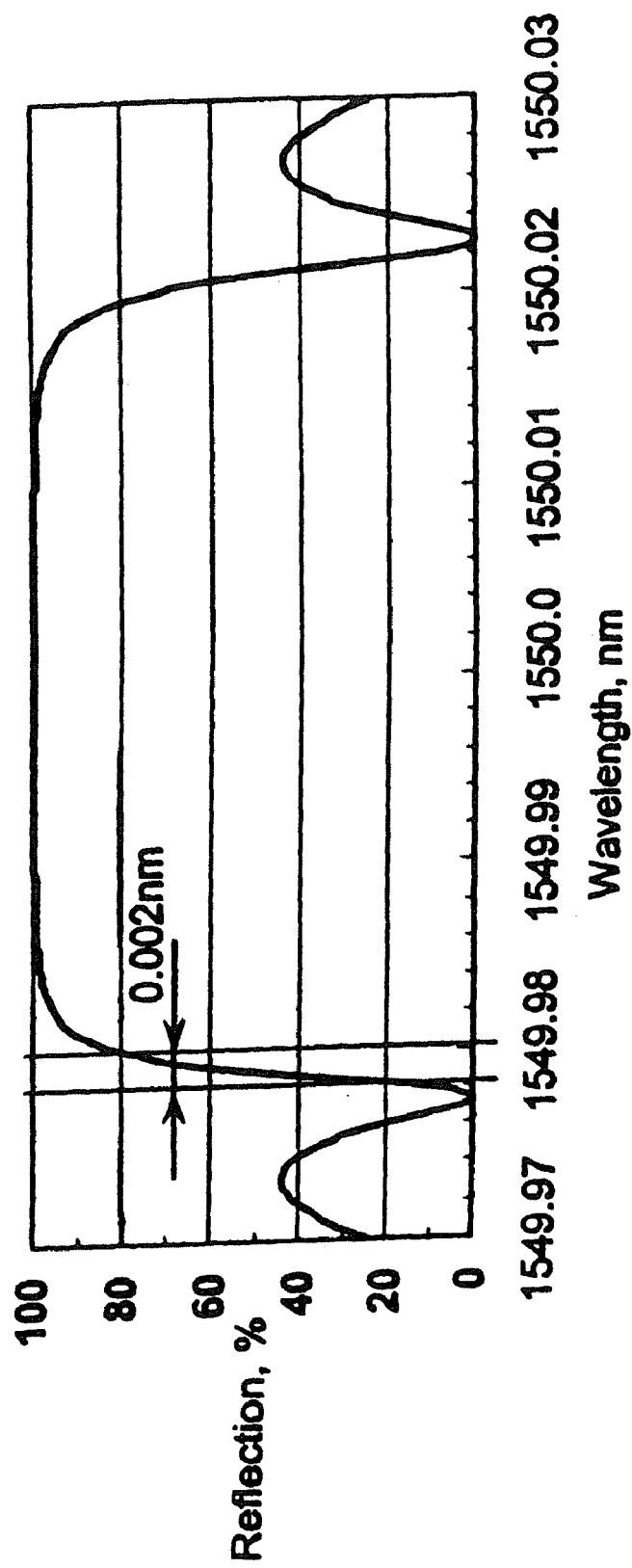
FIG. 4 is a graph of the calculated reflection percentage versus wavelength of a 4 cm length grating on a Ti:LiNbO$_3$ waveguide.

In an example of a method of an embodiment of the present invention as shown in FIG. 3, a 4 cm-length grating for a $\lambda=1550$ nm is on a Ti:LiNbO$_3$ waveguide with a diameter $D_{wg}$ of about 3 μm and a refractive index n=2.16. The calculated spectrum of this grating is shown in FIG. 4. Here, the range where reflected beam intensity varies from 20% to 80% corresponds to a spectral range $\delta\lambda=2$ picometers (pm). To provide this spectral shift, the refractive index of waveguide has to be changed by $$\delta n = \frac{\delta\lambda}{\lambda} n.$$

For example, the largest electro-optic coefficient in LiNbO$_3$ ($r_{33}=30.8\cdot10^{-6}$ μm/V), which is introduced when the polarized fields of the light and applied voltage are in the c-axis of the LiNbO$_3$ crystal, may be utilized to estimate the voltage $V_{mod}$ required for such a modification of refractive index. The change in refractive index may be calculated using the well-known relation 1) (see for example, N. Dagli "High-speed photonic devices," CRC Press, 2007, Chapter 3, p. 32):

$$\delta n = -n^3 r_{33} \frac{V_{mod}}{2 D_{wg}}.$$

Therefore, the modulation voltage may be calculated to be $$V_{mod} = \pm \frac{D_{wg}}{n^2 r_{33}} \frac{\delta\lambda}{\lambda} \approx 0.06 V.$$

However, the modulation voltage $V_{mod}$ may be higher in practical applications due to a larger distance between the electrodes, imperfections of implementation, etc.

As discussed above, the speed of the RF and optical pulse propagation is substantially the same. An example of a desirable tolerance for the RF and optical propagation speeds for one embodiment of the present invention is described below. Here, a waveguide has a grating of length L. If RF pulse propagates through electrodes along the waveguide with a speed $V_{RF}$, the total time of propagation $t_{RF}$ is $$t_{RF} = \frac{L}{V_{RF}}.$$

The time $t_{OP}$ of optical pulse propagation through the waveguide must differ from the time $t_{RF}$ not more than the duration of RF pulse $\tau_{RF}$ to provide good overlapping and interference between the beamlets reflected from all the layers of grating. Taking into account that the speed of the optical pulse $V_{OP}$ is approximately equal to the speed of RF pulse propagation $V_{RF}$, and it is equal to c/n where c is the speed of light in vacuum and n is the refractive index of waveguide, the tolerance $\Delta V/V_{OP}$ is $$\tau_{RF} = t_{RF} = t_{OP} = L\left(\frac{1}{V_{RF}} - \frac{1}{V_{OP}}\right) = L\frac{\Delta V}{V_{OP}^2} = \frac{Ln}{c}\frac{\Delta V}{V_{OP}} \text{ or } \frac{\Delta V}{V_{OP}} = \frac{c \cdot \tau_{RF}}{Ln}.$$

For example, for a 5 cm grating on a Ti:LiNbO$_3$ waveguide (e.g., n=2.16 and c=3×10$^8$ m/s) operating at a 20 GHz frequency (i.e., $\tau_{RF}$ is equal to a half period or)0.5/(2*10$^{10}$ s or 2.5*10$^{-11}$ s), the tolerance of the speeds should be no more than $$\frac{\Delta V}{V_{OP}} \leq \frac{3\cdot10^8 m/s \cdot 2.5\cdot10^{-11}s}{5\cdot10^{-2}m \cdot 2.16} \approx 0.07 \text{ or } 7\%.$$

Changes in grating length or RF frequency will correspondingly result in changes in tolerance.

In another embodiment of the present invention, any sharp spectral fronts of gratings can be used to reach low voltage modulation of reflected or transmitted beams. For example, sharp spectral variations of beam intensity can be obtained with phase-shifted Bragg gratings (see e.g., A. Othonos, K. Kalli. "Fiber Bragg Grating: fundamentals and application in telecommunication and sensing," Chapter 5 (5.3), pp. 203-205, Artech House. Boston, London. 1999), the entire content of which is incorporated by reference. The reflection spectrum of a 7 mm-length phase-shifted grating on Ti:LiNbO$_3$ waveguide, as shown in FIG. 5A, has a region of sharp spectral change of transmitted/reflected intensity. It is shown in FIG. 5B, an enlarged view of the region of sharp spectral change, that a considerable change in intensity can be provided by a spectral shift of less than 0.1 pm or approximately 30 times less than in the above embodiment, and the voltage required for modulation is about 0.002 V. For high-speed applications, opposite directions of optical and electrical signal propagation, and narrowband laser radiation with highly stabilized spectral parameters are desirable, as described above.

In other embodiments of the present invention, other grating designs with sharp spectral dependencies of reflected beam intensity may be utilized, such as a Fabry-Perot-like filter including two identical spatially shifted chirp gratings (see e.g., G. E. Town, K. Sugden, Williams, I. Bennion, S. B. Poole. "Wide-band Fabry-Perot-like filters in optical fiber," IEEE Photonics Technology Letters, v. 7, no. 1, pp. 78-80, 1995), the entire content of which is incorporated by reference. However, the phase response as a function of optical wavelength has to be modified by a single pass through the grating.

What is claimed is:

1. A method of amplitude electro-optic modulation, the method comprising:
    transmitting a narrowband laser light into an electro-optically active waveguide in a first direction, the electro-optically active waveguide having a grating for reflecting the narrowband laser light;
    applying a pulsed electric signal to the electro-optically active waveguide in a second direction substantially opposite to the first direction; and
    modifying the reflection of the grating in a wavelength region of the narrowband laser light by application of the pulsed electric signal.

2. The method of claim 1, wherein a tolerance of the difference in speed between the pulsed electric signal and the narrowband laser light is less than $C\tau_{RF}/Ln$, and wherein C is the speed of light, $\tau_{RF}$ is a pulse duration of the pulse electric signal, L is a length of the grating and n is a refractive index of the waveguide.

3. The method of claim 1, wherein the grating is a phase-shifted grating.

4. The method of claim 1, wherein the grating is a Fabry-Perot-type filter comprising two spatially shifted chirp gratings.

5. An amplitude electro-optic modulator comprising:
- an electro-optically active waveguide for propagating a narrowband light in a first direction, the electro-optically active waveguide having a grating for reflecting the narrowband light, the grating having a grating reflection spectrum with a transition between high and low reflection, the narrowband light having a spectrum substantially within the spectrum of the transition between high and low reflection; and
- at least two electrodes proximate to the grating and being configured to impose an electric pulse along the electro-optically active waveguide in a direction substantially opposite the first direction.

6. The amplitude electro-optic modulator of claim 5 further comprising:
- an optical circulator coupled to the waveguide for inputting the narrowband light into the grating and receiving and directing reflected light from the grating.

7. The amplitude electro-optic modulator of claim 5 further comprising:
- an optical beamsplitter coupled to the waveguide for inputting the narrowband light into the grating and receiving and directing reflected light from the grating.

8. The amplitude electro-optic modulator of claim 5, wherein a tolerance of the difference in speed between the electric pulse and the narrowband light is less than $C\tau_{RF}/Ln$, and wherein C is the speed of light, $\tau_{RF}$ is a pulse duration of the electric pulse, L is a length of the grating and n is a refractive index of the waveguide.

9. The amplitude electro-optic modulator of claim 5, wherein the grating is a phase-shifted grating.

10. The amplitude electro-optic modulator of claim 5, wherein the grating is a Fabry-Perot-type filter comprising two spatially shifted chirp gratings.

11. The method of claim 1, wherein the pulsed electric signal has a duty cycle at less than 50%.

12. The amplitude electro-optic modulator of claim 5, wherein the electric pulse has a duty cycle at less than 50%.

* * * * *